3,519,983
LIGHTWEIGHT UNDERWATER
INSTRUMENTATION
James O. Ewing, Granada Hills, Calif., assignor to The
Bendix Corporation, a corporation of Delaware
Filed Dec. 11, 1968, Ser. No. 782,858
Int. Cl. B63b 21/52, 51/02; G01s 9/66
U.S. Cl. 340—2
10 Claims

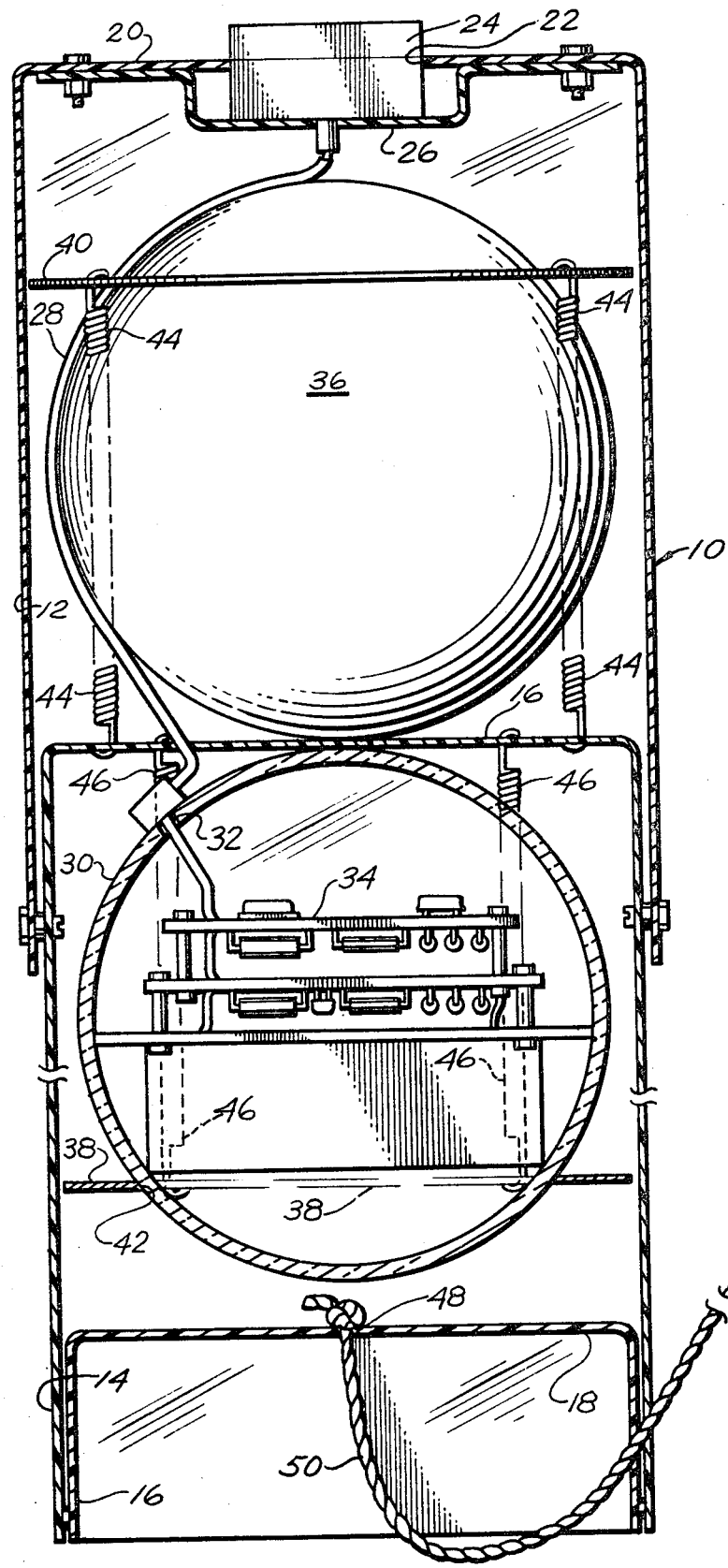

ABSTRACT OF THE DISCLOSURE

A lightweight, low-cost underwater transponder is described in which a pair of glass spheres are used as floatation means, the spheres being contained within a lightweight, free-flooding housing of glass epoxy material. A receiving and transmitting transducer is attached to the top of the housing, and an anchor is attached near the bottom of the housing and is fastened to the housing by means of a rope. The lower of the two glass spheres contains a battery pack and the electronic assembly necessary for driving the transponder transducer. The housing is formed of a plurality of nesting cylindrical elements to provide for rigidity and to provide internal bulkheads, and various means are provided for protecting the glass spheres against damage through colliding with each other or with the side walls of the housing.

BACKGROUND OF THE INVENTION

Underwater transponder devices have been in use for some time, particularly as navigation aids for ships. By locating a plurality of such transponders at known locations on the ocean bottom, one may determine the location of a ship in the area by interrogating the transponders separately and determining the direction of the response.

Transponders presently in use are typically very large, bulky, heavy and expensive. Since they are designed to operate for periods exceeding a year without attention, they necessarily contain a very substantial weight of batteries, typically of the lead-acid variety, which are housed in the anchor structure. The flotation means employed has often consisted merely of a tank of hydrocarbon liquid, such as kerosene, which is sealed to prevent leakage and to which is attached the electronic receiver-transmitter assembly and the necessary acoustic transducer. The flotation tank must therefore support itself plus the electronic assembly and transducer, plus the cable extending between itself and the anchor. Since the buoyancy of kerosene per unit volume is not great, such tanks tend to be relatively large and heavy to handle in air, as, of course, is the anchor containing the batteries. The combination, attached by means of a cable, tends to be so heavy and awkward to handle on shipboard as to be somewhat dangerous to personnel.

There are many applications for which the assembly described above is far more heavy, bulky and expensive than is warranted. Applicant has devised the assembly described herein to meet these applications, thereby providing a device which is far lighter, less expensive, and much easier to handle than transponders currently in use.

SUMMARY

The transponder disclosed in the present application utilizes much the same electrical components described above, but these are housed differently and supported in the water differently from conventional practice. Thin-walled glass spheres are currently available which will withstand external pressures of approximately 10,000 pounds per square inch. Since they are relatively light and contain only air, the buoyancy afforded by such a glass sphere is very substantial. It has been found that these glass spheres may be opened and resealed and that satisfactory seals can be made around small openings or ports in the side walls of said spheres, and therefore it is possible to install equipment inside of such spheres with reasonable assurance that the assembly will withstand substantial underwater pressures. The specific underwater transponder described herein consists of an assembly including one glass ball which contains both the receiver-transmitter assembly for the transducer and the battery pack required to power these elements, and another sphere which provides flotation only, and these two spheres are restrained within a lightweight glass epoxy housing which includes means for supporting the transducer at one end and for connection to a rope tied to an anchor at the opposite end. A number of means can be provided for restraining the spheres within the housing so that they do not become damaged by jarring against each other or against the side of the housing, but shown herein is an arrangement consisting of a circular plate whose outside diameter approximately equals the inside diameter of the housing and which includes a circle cutout for receiving a portion of the sphere, and this plate is then attached by resilient means to one of the internal bulkheads in the housing. Alternatively, the spheres may be restrained by means of conventional packing, such as rubberized hair or syntactic foam.

DESCRIPTION OF THE DRAWING

The single figure is a view, primarily in section, of an underwater transponder made according to my invention.

DESCRIPTION OF THE PREFFERED EMBODIMENT

Referring now to the drawing, a housing is shown generally at numeral 10 including a plurality of sections 12, 14 and 16 of generally cylindrical form which telescope or nest as shown to provide rigidity for the structure and also to provide internal bulkheads such as those shown at numerals 16 and 18, as well as end section 20 which has a circular cutout 22 to accommodate the receiving and transmitting transducer 24. This transducer is supported by means of a bracket 26 bolted to end section 20. The transducer 24 is connected by means of a wire or cable 28 to the lower of two glass or ceramic spheres 30, which is shown herein in section and which includes a sealed port 32 to permit the passage of conducting wires to the electronic assembly and battery pack 34 carried within sphere 30. Because of the necessary weight of the battery pack, the assembly 34 is of such weight that the entire sphere 30, including assembly 34, is only slightly buoyant. To provide adequate buoyancy for the entire assembly, an additional sphere 36 is included in housing 10 and is located toward to top of the housing to assist in retaining the desired orientation of the transducer 24, since this requires that the assembly remain essentially vertical, as shown, for best operation. The glass spheres 30 and 36 are held firmly against the bulkhead 16 by means of restraining devices consisting of lightweight plates 38 and 40, respectively, of epoxy glass material which include circular cutouts as shown at numeral 42 for permitting a portion of the sphere to extend through the retaining plate. Each of the plates 40 and 42 is attached to the intermediate bulkhead 16 by means of a plurality of tension springs 44, 46. Normally, three such springs would be included for each sphere.

Many equally satisfactory arrangements might be used for restraining the spheres 30 and 36 within the housing 10, it being necessary only to provide such means as will prevent the spheres from damage caused by jarring into each other or against the sides of the housing. Since these spheres are of glass or ceramic material having similar properties, they have great resistance to static external pressure, but are vulnerable to chipping or cracking from sharp blows applied over small areas.

At the lower end of housing 10 is a bulkhead 18 which includes a centrally located port 48 for receiving a tethering rope 50 which is knotted or otherwise secured to the upper side of bulkhead 18 so that it will not slip through port 48. Attached at the opposite end of rope 30 is an anchor 52. The rope 50 and a portion of anchor 52 may arranged to rest within the cylindrical section 16 while the transponder is in storage prior to launch.

It will therefore be understood from the foregoing that applicant has provided a very lightweight, easily handled transponder assembly which includes sufficient flotation means to assure proper vertical orientation of the housing 10 and the transducer 24 and which may be handled by persons on shipboard without the difficulties so prevalent with the much larger and heavier devices used heretofore. While the operating life of the device shown herein is somewhat limited by the small size of the battery pack which can be included within the sphere 30, this is adequate for many applications. Where longer life is required, the battery can be placed in the anchor 52 as has been done in the past, in which case at least part of the additional buoyancy provided by removing the battery from sphere 30 will be consumed in supporting the extra conductor which would then parallel or be fastened to or incorporated with the tethering cable or rope 50. If additional buoyancy is required, it can be provided by simply adding spheres and housing sections as required. While it might be thought that larger spheres would also be satisfactory, applicant has not had satisfactory experience with the durability of spheres larger than approximately 10 to 12 inches in diameter, so there are practical limitations on the amount of buoyancy which can be provided per sphere, particularly where external pressure of the order of 10,000 pounds per square inch are encountered.

I claim:

1. An instrumentation assembly for mooring on the bottom of a body of water including a free-flooding housing,
   an anchor tethered to the end of said housing normally positioned nearest said bottom,
   a sonar transducer fastened to said housing and located at the upper end of said housing,
   a first flotation member in said housing comprising a hollow sphere of inorganic, nonmetallic material,
   a second spherical flotation member of inorganic, nonmetallic material in said housing positioned below said first flotation member and circuit means carried within said second flotation member electrically connected with said transducer.
   an electrical power source for said transducer and said circuit means, and
   means positioning said first and second flotation members within said housing such that said members are prevented from striking against each other or said housing with sufficient force to damage said flotation members.

2. An instrumentation assembly as set forth in claim 1 wherein said flotation members are hollow glass spheres.

3. An instrumentation assembly as set forth in claim 1 wherin said housing is formed of glass epoxy material and comprises a plurality of nesting cylindrical members whose end sections provide transverse bulkheads for said housing.

4. An instrumentation assembly as set forth in claim 1, 2 or 3 wherein said electrical power source comprises a battery carried within a spherical flotation member in said housing.

5. An instrumentation assembly as set forth in claim 3 wherein said spheres are separated by means of one of said bulkheads and resilient loading means are provided to urge said spheres against at least one of said bulkheads.

6. An instrumentation assembly as set forth in claim 5 wherein lightweight circular members are provided whose diameter is slightly smaller than the internal diameter of said cylindrical members having centered holes smaller in diameter than the diameter of said spheres and a plurality of springs are provided which are fastened between one of said bulkheads and said circular members for urging said flotation members toward said bulkhead.

7. An instrumentation assembly as set forth in claim 1, 2 or 3 wherein said positioning means includes packing material of rubberized hair.

8. In an underwater transponder assembly including a housing, a transducer carried by said housing, a source of electrical power, an anchor tethered to said housing, and flotation means in said housing to permit said housing to be floated at a significant distance from said anchor and such as to maintain said transducer at a desired attitude:
   characterized in that said housing consists of a lightweight free-flooding container of glass epoxy material,
   said flotation means comprises a plurality of hollow glass spheres carried in said housing with one of said hollow glass spheres containing an electronic assembly connected to said transducer and said source of electrical power, and
   positioning means are contained within said housing to prevent said spheres from striking against each other or said housing with sufficient force to damage said spheres.

9. An underwater transponder assembly as set forth in claim 8 wherein said housing consists of a plurality of nesting cylindrical members whose end sections provide transverse bulkheads for said housing.

10. An underwater transponder assembly as set forth in claim 8 or 9 in which said source of electrical power is carried in one of said glass spheres.

References Cited

UNITED STATES PATENTS 3,178,736    4/1965    Gross _____ 9—8

RICHARD A. FARLEY, Primary Examiner

U.S. Cl. X.R.

9—8